(12) United States Patent
Katsaros

(10) Patent No.: US 9,442,040 B2
(45) Date of Patent: Sep. 13, 2016

(54) METHOD FOR DETERMINING A BEARING PRELOAD

(71) Applicant: Padelis Katsaros, Schweinfurt (DE)

(72) Inventor: Padelis Katsaros, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 121 days.

(21) Appl. No.: 14/166,066

(22) Filed: Jan. 28, 2014

(65) Prior Publication Data

US 2014/0216172 A1    Aug. 7, 2014

(30) Foreign Application Priority Data

Jan. 28, 2013 (DE) .................. 10 2013 201 324

(51) Int. Cl.
| | | |
|---|---|---|
| G01H 1/08 | (2006.01) | |
| G01M 13/02 | (2006.01) | |
| G01M 13/04 | (2006.01) | |
| G01N 29/00 | (2006.01) | |
| G01L 1/25 | (2006.01) | |

(52) U.S. Cl.
CPC ............ G01M 13/045 (2013.01); G01L 1/255 (2013.01)

(58) Field of Classification Search
CPC .......................... G01M 13/045; G01L 1/255
USPC ............................................. 73/862.59, 593
See application file for complete search history.

(56) References Cited

U.S. PATENT DOCUMENTS

| | | | | |
|---|---|---|---|---|
| 5,048,320 A | * | 9/1991 | Mitsuhashi et al. .... | G01M 7/08 73/12.09 |
| 5,717,141 A | * | 2/1998 | Kikuchi et al. ................. | 73/579 |
| 6,053,047 A | * | 4/2000 | Dister et al. ........ | G01M 13/028 73/593 |
| 6,234,022 B1 | * | 5/2001 | Tadokoro .............. | G01M 7/025 73/593 |
| 6,286,374 B1 | * | 9/2001 | Kudo et al. ................. | 73/862.59 |

(Continued)

FOREIGN PATENT DOCUMENTS

| | | | |
|---|---|---|---|
| DE | 19940869 A1 | 4/2000 | |
| DE | 10201100690 A1 * | 10/2012 | .............. F16C 19/52 |

(Continued)

OTHER PUBLICATIONS

Bibliographic Data and Abstract for DE 102011006907 A1, Date of Publication of DE 102011006907 A1: Oct. 11, 2012, Publisher of Bibliographic Data and Abstract: Thomson Reuters.*

(Continued)

*Primary Examiner* — Lisa Caputo
*Assistant Examiner* — Roger Hernandez-Prewit
(74) *Attorney, Agent, or Firm* — Bryan Peckjian; SKF USA Inc. Patent Dept.

(57) ABSTRACT

A device for determining a bearing preload of a rolling-element bearing includes an exciter configured to be attachable to a component of the rolling-element bearing and to excite the component of the rolling-element bearing and cause it to vibrate when the rolling-element bearing is not rotating, at least one vibration sensor configured to be attachable to the component or to a further component of the rolling-element bearing and to record (capture) a mechanical reaction, in response to the excitation, of the component or the further component of the rolling-element bearing, and an evaluating circuit configured to receive the sensor signal and provide an evaluation signal based on the sensor signal, the evaluation signal including information about the bearing preload. An associated method and computer program are also disclosed.

15 Claims, 3 Drawing Sheets

(56) References Cited

U.S. PATENT DOCUMENTS

| | | | |
|---|---|---|---|
| 6,546,781 B1 * | 4/2003 | Deegan et al. | G01N 29/045 73/1.82 |
| 6,553,837 B1 * | 4/2003 | Lysen | 73/579 |
| 6,880,403 B1 | 4/2005 | Shimada et al. | |
| 6,918,302 B2 * | 7/2005 | Yamada | F16C 19/54 73/593 |
| 7,503,216 B2 * | 3/2009 | Yamada et al. | F16C 19/52 73/593 |
| 8,313,240 B2 * | 11/2012 | Giordana | G01L 5/0009 384/448 |
| 2009/0040935 A1 * | 2/2009 | Murata et al. | G01M 13/045 370/242 |
| 2011/0010785 A1 | 1/2011 | Difede et al. | |
| 2014/0157880 A1 * | 6/2014 | Matsuda et al. | F16C 41/008 73/112.01 |

FOREIGN PATENT DOCUMENTS

| | | |
|---|---|---|
| JP | H06221962 A | 8/1994 |
| JP | 2003329512 A | 11/2003 |

OTHER PUBLICATIONS

Authors: Aydin Gunduz, Jason T. Dreyer and Rajendra Singh, Title: Effects of Preloads on Vibration Transmission Through Double Row Angular Contact Ball Bearings, Date: Aug. 2011, Publisher: ASME, Proceedings of the ASME 2011 International Design Engineering Technical Conferences & Computers and Information in Engineering Conference, pp. 1-10.*

Author: unknown; Title: Determining preload force, Date: Dec. 28, 2012, Publisher: SKF, Pertient pp. 4, URL: http://www.skf.com/us/products/bearings-units-housings/ball-bearings/principles/application-of-bearings/bearing-preload/determining-preload-force/index.html.*

Author: Aydin Gunduz, Jason T. Dreyer and Rajendra Singh, Title: Effects of Preloads on Vibration Transmission Through Double Row Angular Contact Ball Bearings, Date: Aug. 29-31, 2011, Publication: Proceedings of the ASME 2011 International Design Engineering Technical Conferences & Computers and Information in Engineering Conferc, IDETC/PTG 2011.*

* cited by examiner

METHOD FOR DETERMINING A BEARING PRELOAD

CROSS-REFERENCE

The present application claims priority to German patent application no. 10 2013 201 324.8 filed on Jan. 28, 2013, the entire contents of which are incorporated by reference herein.

TECHNICAL FIELD

Exemplary embodiments relate to a device and a method for determining a bearing preload of a rolling-element bearing.

BACKGROUND

In many types of rolling-element bearings, the preload represents a significant operating parameter. The preload, which may also referred to as the "bearing preload," influences wear and thus the service life of a particular rolling-element bearing. If, for example, a rolling-element bearing is subjected to a high dynamic or static load, it may be advisable to set a higher preload value than with lesser loads, in order to make possible as uniform as possible a distribution of the particular load on all rolling elements. Here the wear can occur, for example, due to the sliding component of the movement of the rolling elements along the respective berating rings. In particular at lower rotational speeds, a state of mixed friction can act in a wear-promoting and thus service-life-reducing manner.

On the other hand, using too large a preload can lead to an increase of the friction in an interior of the rolling-element bearing, which in turn can increase energy consumption.

Thus, while in the past there was a tendency for large preload values to be chosen more often in the interest of prolonging service life, recently the preload and its optimal setting have returned to the center of attention, not least because of the friction problem described above.

The setting of the preload in tapered roller bearings and angular contact ball bearings, but also in other bearings, remains, as in the past, a costly and imprecise process. The preload is conventionally set by either measuring a friction torque of the bearing assembly or by adjusting/setting the friction torque using a shim ring/fitting washer. In the first-mentioned friction torque setting, a friction torque increase is measured which is typically accompanied by an increase in the bearing preload. Once the bearing preload reaches a certain value, then, for example, nuts used for attaching the bearing or for generating the preload are secured against further turning.

The other method consists of measuring the components in the load circuit in question and then generating the required load path using a shim ring. This then induces (brings about) the required preload when the nut used for attaching and for generating the preload is tightened. In this case, based on the achieved tolerances of the components included in the load circuit in question, a shim ring is thus fitted/adapted such that on the one hand the position, and on the other hand the preload generated by the tightening of the nut, are harmonized/coordinated with one another. The conventional assembly method of such a rolling-element bearing, wherein the bearing preload represents a relevant parameter for the later use of the rolling-element bearing, can therefore often be wasteful, imprecise, and/or expensive.

There is therefore a need to for an easier way of determining a bearing preload of a rolling-element bearing.

SUMMARY

A device according to an exemplary embodiment for determining a bearing preload of a rolling-element bearing comprises an exciter (stimulator) which is formed to be attachable to a component of the rolling element bearing and to excite/stimulate the components of the rolling-element bearing to vibrate (oscillate) when the rolling-element bearing is not rotating. The device also comprises at least one vibration (oscillation) sensor which is attachable to the same component or to a further component of the rolling-element bearing in order to record or capture a mechanical reaction of the component or the further component of the rolling-element bearing to the excitation and provide a sensor signal which includes information concerning the reaction. The device further comprises an evaluating/analyzing circuit configured to receive the sensor signal and provide an evaluation signal based on the sensor signal, which evaluation signal includes information concerning the bearing preload.

A method according to an exemplary embodiment for determining a bearing preload of a rolling-element bearing comprises exciting a component of the rolling element bearing in order to effect (bring about) vibration(s) when the rolling-element bearing is not rotating, recording (capturing) a mechanical reaction of the component or of a further component of the rolling-element bearing to the excitation, and providing (generating) an evaluation signal based on the mechanical reaction such that the evaluation signal includes information concerning the bearing preload.

An exemplary embodiment is thus based on the recognition that the determination of the bearing preload of a rolling element bearing can be simplified by subjecting a component of the rolling element bearing to vibration while the rolling-element bearing is not rotating. This excitation effects (brings about) a mechanical reaction at the component or at a further component of the rolling-element bearing, which is received for example using one or more vibration sensors, so that based on the recorded (captured) mechanical reaction an evaluation signal can be provided which includes information concerning the bearing preload. Exemplary embodiments are thus based on the recognition that the bearing preload of a rolling-element bearing can be determined via excitation of a vibration and detecting of a mechanical reaction thereto.

For this purpose, in addition to the above-mentioned at-least-one vibration sensor, a device according to an exemplary embodiment for determining a bearing preload has a corresponding exciter (stimulator) which is attachable to the component of the rolling-element bearing and can excite the rolling-element bearing. The at-least-one vibration sensor outputs a sensor signal which is evaluated by the evaluating circuit to the effect that this sensor signal provides an evaluation signal which includes the above-mentioned information concerning the bearing preload.

Exemplary embodiments thus use a detection of a change of the natural/resonant frequency of the rolling-element bearing, which change is associated with a change of the bearing preload. For this reason a corresponding setting of the bearing preload of a rolling-element bearing or of a bearing assembly is also referred to as an "acoustic setting."

The exciter is formed such that it is indirectly or directly attachable to the component of the rolling-element bearing. "Direct attachment" is understood here to mean an attachment wherein the exciter or another component is directly in contact with the component of the rolling-element bearing. With an "indirect attachment," the exciter or the respective other component is connected to or attachable to the respective component of the rolling-element bearing via a part, for example a housing. Here the exciter is of course designed such that the component of the rolling-element bearing can be made to vibrate by the exciter. This can occur, for example, such that the part disposed between the exciter and the component is connected to both such that mechanical vibrations can be transmitted from the exciter, via the part, to the component of the rolling-element bearing.

Accordingly, the vibration sensor can also be indirectly or directly attachable to the component or further component of the rolling-element bearing. In the case of an indirect attachment, i.e. for example an attachment via a further part, this attachment is designed such that the vibration sensor can receive the mechanical reaction of the component or of the further component of the rolling-element bearing. Again this can be achieved, for example, by connecting the vibration sensor to the component or to the further component such that vibrations can reach the vibration sensor via the further part.

Since a corresponding determining of the bearing preload is possible without rotating the rolling-element bearing, i.e. the bearing preload can be measured statically, the corresponding measuring procedure can often be carried out more simply than with a determination that involves rotating the rolling-element bearing, for example using a friction torque measurement. The bearing preload can also optionally be measured more precisely, so that the precision of the setting of the bearing preload increases, and it is thus possible to reduce the costs associated therewith. An optimal preload and therefore a reduction of friction losses is thus optionally achievable.

In a device according to an exemplary embodiment, the exciter can for example be formed to excite, in response to a trigger signal, the component of the rolling-element bearing with an excitation frequency spectrum using a shock-like (impact-like) excitation. Using such a shock-like excitation, which resembles or approximates a δ-like excitation of the system, a (quasi-) continuous excitation spectrum can be generated. In this manner, the natural frequency of the rolling element bearing or of the components involved can be addressed or activated in the excitation frequency spectrum. In this way a simple and rapid determination of the bearing preload can be achieved.

In such a device according to an exemplary embodiment, the exciter can thus comprise a mass preloaded by a spring element, and the mass effects the shock-like excitation of the component of the rolling-element bearing in response to a trigger signal. In this way the δ-like excitation can be achieved using a relatively simple mechanical exciter. Here the trigger signal can be an electrical, optical, radio, or even mechanical trigger signal.

In such a device according to an exemplary embodiment, the exciter can further be formed to effect the shock-like excitation repeatedly. In this way measurement statistics can be improved, which can in turn lead to a more precise determination of the bearing preload. For this purpose, such a device according to an exemplary embodiment can include a retracting element which returns the above-mentioned mass back to its preloaded state. The retracting element can for example be a pneumatic, hydraulic, or electric actuator, i.e. for example a pneumatic or hydraulic piston in a corresponding cylinder. The spring element can also be designed, for example, as a mechanical spring element, i.e. for example a coil spring or other mechanical spring. The spring element can also be formed as a pneumatic or hydraulic spring, wherein for example a pressurized gas or a pressurized liquid flows in a pressure cylinder against a corresponding piston. Likewise it can also be an amount of gas under excess pressure, enclosed in a confined volume, the volume of which amount of gas is variable. This can occur, for example, in that the respective quantity of gas is enclosed in a gas balloon/bag or a pneumatic cylinder.

In a device according to an exemplary embodiment, the exciter can be configured to effect an excitation of the component of the rolling-element bearing that is tunable with respect to a frequency and/or an amplitude. In this way a more precise determination of the bearing preload can be made possible, because the rolling-element bearing or its components can be excited in a targeted manner with respect to a frequency and/or amplitude.

In such a device according to an exemplary embodiment, the exciter can for example comprise a piezoelectric actuator configured to excite the component with a frequency and/or amplitude which depends on an excitation signal. This allows for a very flexible and simultaneously compact excitation of the component of the rolling-element bearing.

In such a device according to an exemplary embodiment, the exciter can be coupled with the evaluating circuit. The evaluating circuit is configured in this case to provide the excitation signal and/or the trigger signal. In this way an interaction of the user of the device with the rolling-element bearing can optionally be further reduced, since the user now only needs to operate the unit which includes the evaluating circuit.

In a device according to an exemplary embodiment, the at-least-one vibration sensor can be formed to be magnetically attachable to the component or the further component of the rolling-element bearing. Especially in the case of a component of a rolling-element bearing, which component is manufactured from a magnetic material, such a component can make possible an attachment of the vibration sensor in a direct manner which thus causes minimal impairment of the determination of the preload. In such an exemplary embodiment, the at least one vibration sensor can thus comprise a magnet assembly, using which the vibration sensor is attachable to the component or the further component of the rolling-element bearing. This can create a very compact and easy-to-attach arrangement to bring the vibration sensor into contact with the respective component of the rolling-element bearing.

In such a device according to an exemplary embodiment, the at-least-one vibration sensor can be a microphone or an MEMS sensor (MEMS =microelectromechanical system). In this way a particularly compact vibration sensor can be provided which can also be attached to small components, i.e. for example to one or more of the rolling elements.

In a device according to an exemplary embodiment, the vibration sensor can comprise a plurality of vibration sensors which provide a plurality of sensor signals. In this case the evaluating circuit can be configured to process the plurality of sensor signals individually or after averaging them. In this way a determining of the bearing preload of the rolling-element bearing can be improved, since the statistics of the determining can be improved by the plurality of the vibration sensors. This allows statistical anomalies to be averaged out or otherwise taken into account. Thus for example the influence of a different arrangement of the rolling elements along a rolling-element bearing ring can be better taken into consideration.

In a device according to an exemplary embodiment, the at-least-one vibration sensor can be configured such that the sensor signal includes information concerning a frequency spectrum of the reaction to the excitation. In this way the determination can optionally be accelerated, since information is available with respect to a plurality of frequencies, specifically those of the relevant spectrum.

In such a device, the evaluating circuit can be formed to provide the bearing preload based on a frequency value which corresponds to a reaction maximum in the frequency spectrum of the reaction or a part of the frequency spectrum of the reaction. Here the reaction maximum can for example be an amplitude, an intensity, or an energy of the reaction, i.e. the particular vibration recorded (captured) by the at-least-one vibration sensor at the frequency value in question. In other words, the evaluating circuit can be formed so as to provide information with respect to the bearing preload based on the frequency value, wherein the sensor signal in the respective frequency spectrum or the respective part of the frequency spectrum has its maximum value with respect to amplitude, intensity, energy, or another characteristic value. "Characteristic value" thus also includes a corresponding logarithmic value, or a specified magnitude with respect to a relative value.

In order to use (only) a part of the frequency spectrum of the reaction for determining the above-mentioned frequency value, in a device according to an exemplary embodiment a band-pass filter, a high-pass filter, or a low-pass filter can be utilized, which band-pass, high-pass, or low-pass filter is configured to isolate the relevant part of the frequency spectrum of the reaction from other parts of the frequency spectrum of the reaction. In this way a maximum value of the reaction, which maximum value occurs in another part of the frequency spectrum, can optionally be hidden, which maximum value is caused for example by different natural frequencies.

In such a device according to an exemplary embodiment, the evaluating circuit can be configured to provide the information concerning the bearing preload based on a comparison of the frequency value to a predetermined frequency value of a predetermined frequency range. Thus the determination of the bearing preload can be simplified in that the evaluating circuit provides information which indicates whether the bearing preload lies (falls) within a target range (predetermined frequency range) or at a target value (predetermined frequency value). Likewise, the evaluating circuit can also supply information which indicates whether the determined bearing preload and thus the corresponding frequency value lies (falls) above or below the predetermined frequency value or the predetermined frequency range, and optionally provide further information on the basis of which it can be at least estimated, if not actually determined, how far the determined bearing preload lies (falls) from the target value or the target range.

In a device according to an exemplary embodiment, the component and optionally the further component can be a rolling element or a rolling-element bearing ring, i.e. for example an inner ring or an outer ring, wherein the rolling-element bearing ring is in contact with at least one of the rolling elements. Likewise, in an exemplary embodiment the component and optionally the further component can also be a rolling-element cage.

A method according to an exemplary embodiment for determining a bearing preload of a rolling-element bearing can optionally further comprise providing a sensor signal, which sensor signal includes information concerning the reaction.

Likewise, a method according to an exemplary embodiment can comprise subjecting the rolling-element bearing to a plurality of rotations (revolutions) and then stopping the rotations prior to the exciting of the component of the rolling-element bearing. In this way it can be ensured that the rolling-element bearing is in an operating position with respect to the rolling elements and the rolling-element bearing ring as well as the optionally-implemented rolling-element cage. Here the rolling-element bearing can be rotated by a predetermined number of rotations or a predetermined range of numbers of rotations, which number lies (falls) for example between 5 and 30 rotations or between 10 and 15 rotations.

A method according to an exemplary embodiment for determining a bearing preload of a rolling-element bearing can further comprise setting (adjusting) the bearing preload, if the evaluating circuit indicates an actual bearing preload which corresponds to a predetermined bearing load or lies (falls) in a predetermined range of bearing preloads. Here the setting (adjusting) of the bearing preload can comprise fixing a nut or another component of the rolling-element bearing, or of a bearing unit including the rolling-element bearing.

BRIEF DESCRIPTION OF THE DRAWINGS

Exemplary embodiments are explained in more detail below with reference to the accompanying figures.

DETAILED DESCRIPTION

In the context of the present description, summarizing reference numbers are used for objects, structures, and other components if the relevant component is described with respect to itself or a plurality of corresponding components within an exemplary embodiment or within a plurality of exemplary embodiments. Passages of the description which refer to a component are therefore transferable to other components in other exemplary embodiments, insofar as this is not explicitly excluded or this follows from the context. If individual components are referred to, individual reference numbers are used which are based on the corresponding summarizing reference numbers. In the following description of embodiments, like reference numbers refer to like or comparable components.

Components which occur multiple times in an exemplary embodiment or in different exemplary embodiments can thereby be embodied or implemented identically and/or differently with respect to some of their technical parameters. It is thus for example possible that a plurality of entities can be implemented identically within an exemplary embodiment with respect to one parameter, but differently with respect to another parameter.

Figure 1:
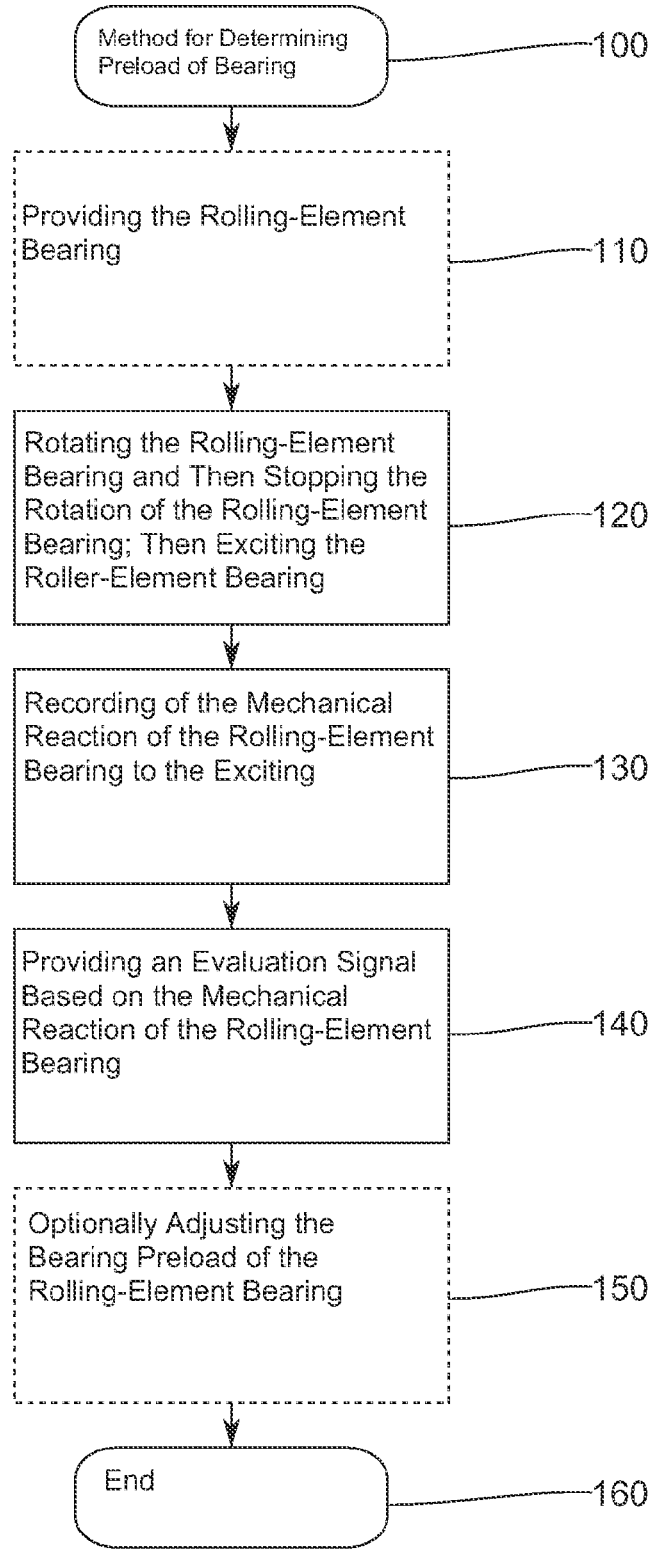
FIG. 1 is a flow diagram of an exemplary embodiment of a method for determining a bearing preload of a rolling-element bearing.

FIG. 1 shows a flow diagram of a method according to an exemplary embodiment for determining a bearing preload of a rolling-element bearing. Initially the basic flow of a method for determining a bearing preload of a rolling-element bearing is described in the context of FIG. 1, before further details in the context of the description of an exemplary embodiment of an associated device, and a description of the corresponding reactions of the rolling-element bearing or its components are continued in the context of FIGS. 2 and 3.

In the context of the present description, a "component of the rolling-element bearing" is understood to mean an inner ring, an outer ring, a rolling element, or a cage for the rolling elements (rolling-element cage). Typically an axial force is applied to generate a pretension on the inner ring or the outer ring. As a result of an appropriate arrangement of the raceways of the outer and inner ring, this axial force causes a radial force to be transmitted from the respective rolling-element bearing ring, via the rolling elements, to the other rolling-element bearing ring. A "bearing assembly," or "rolling-element bearing assembly," as well as a "bearing unit," refer here to subassemblies which include further components or subassemblies in addition to a rolling-element bearing. Thus for example a bearing assembly or a bearing unit can also include a plurality of rolling-element bearings and/or a housing. In addition to the components and subassemblies of the respective rolling element bearing, seals and baffles, for example, are also referred to as components of the respective rolling-element bearing.

FIG. 1 shows a flow diagram of an exemplary embodiment of a method for determining a bearing preload of a rolling-element bearing. The method first comprises an optional providing 110 of the rolling-element bearing. The rolling-element bearing can for example be preassembled and include components like its inner ring, its outer ring, its rolling elements, and optionally further components, such as for example the rolling-element cage.

The method may also include rotating the rolling-element bearing and then stopping the rotation before a component of the rolling-element bearing is excited (120) in order to effect a vibration, without, however, rotating the rolling-element bearing. Rotating and subsequent stopping the rotation of the rolling element bearing helps ensure that the rolling elements are in contact both with the outer ring and with the inner ring, as well as with an optionally-implemented guide flange of one of the two above-mentioned rolling-element bearing rings. In many exemplary embodiments, which will be explained in more detail in the further course of the description, the inner ring has a corresponding guide flange. In different exemplary embodiments, the number of rotations carried out prior to excitation can be between 5 and 30 complete rotations of the rolling-element bearing. In other exemplary embodiments, this number may also lie in the range of 10 to 15 rotations. This approach is also referred to as the so-called "run-down" effect.

The providing 110 of the rolling-element bearing can further comprise attaching an exciter to a component of the rolling-element bearing, and optionally attaching at least one vibration sensor to the component or another or further component of the rolling-element bearing.

The providing 110 can further comprise a preloading of the rolling-element bearing, which can be effected for example by a tightening of a nut or another component, or alternately, by another mechanism. The preloading is typically carried out following the above-mentioned plurality of rotations, in order to ensure a proper position of the rolling elements with respect to the inner and outer ring, as well as with respect to the optionally-implemented guide flanges during the preloading. In other words, to help ensure that the rolling elements are substantially in a proper operating position during the preloading.

The providing 110, which is carried out prior to the exciting 120, often also comprises attaching an exciter to a component of the rolling-element bearing and attaching at least one vibration sensor to the component or a further component of the rolling-element bearing.

The exciting 120, which is subsequent to the providing 110 if the providing 110 is part of the method, comprises exciting the component of the rolling-element bearing, onto which component the exciter is attached, in order to effect a vibration without rotating the rolling-element bearing. A recording (capturing) 130 of a mechanical reaction to the exciting, which reaction is carried out on the component or the further component, is carried out temporally subsequent to or simultaneous with the exciting of the component of the rolling-element bearing.

Whether the recording (capturing) of the mechanical reaction of the component or of the further component is carried out or not depends not least on where the corresponding vibration sensors are attached. The receiving 130 of the mechanical reaction optionally also comprises the providing of a sensor signal which includes information concerning the reaction. The corresponding sensor signal can for example be a continuous and/or a quantized signal, i.e. for example an analog signal or a digital signal. Likewise it can be an electrical, optical, magnetic, or radio signal.

The method for determining a bearing preload of the rolling-element bearing further comprises providing 140 an evaluation signal based on the mechanical reaction. The providing 140 can be carried out after the recording (capturing) 130 or during the recording (capturing) 130 of the mechanical reaction. The evaluating signal is provided so that it includes information about he bearing preload. Further details thereof are provided in the context of FIGS. 2 and 3.

The method 150 can optionally further comprise setting (adjusting) 150 the bearing preload of the rolling-element bearing. This can comprise changing the nut or of the other component to generate the bearing preload of the rolling-element bearing, or change the optional other mechanism for generating the bearing preload. It can also comprise fixing the nut or of the further component or fixing the other mechanism, in order to inhibit a change of the bearing preload even under operating conditions, but make it considerably more difficult rather than preventing it entirely. This can be done, for example, by fixing or locking or counterscrewing the nut in question using a spring ring or a further nut.

The method for determining the bearing preload then ends in a step 160.

As the description in the context of FIG. 1 has already shown, the method for determining the bearing preload of a rolling-element bearing or also the setting of the bearing preload proceeds in a manner similar to tuning a stringed instrument. Again, a certain natural frequency of the preloaded bearing component can be assigned to a preload. The natural frequency is determined by exciting 120 the component of the rolling-element bearing, and recording (capturing) 130 the mechanical reaction 130 of the respective component or of the further component of the rolling-element bearing. The method for setting (adjusting) the bearing preload thus comprises preloading the respective bearing assembly using a nut or another mechanism. The recording (capturing) 130 of the mechanical reaction can occur via small microphones or other vibration sensors, which for example can be attached to the lateral surfaces of one, two, three, or even more rolling elements. The vibration sensors or microphones can be magnetically attached to the sides of the rolling elements via, for example, an implemented magnet assembly.

Alternatively, for example in the case of poor accessibility of the rolling elements, the vibration sensors, which are also referred to as sound pickups, can be attached to the inner ring or the outer ring.

For example, with a short impulse, i.e., for example a shock, the system can then be stimulated or excited (exciting 120). The frequency which is recorded (captured) or registered by the microphones in the context of the recording (capturing) 130 can then be measured using an evaluating circuit, which can for example be integrated in a handheld device. Corresponding measured values and, optionally, equivalent preload values can then by provided by the evaluating circuit in the form of an evaluation signal and displayed by the corresponding device. If similar-sized measuring devices are already used in the context of the manufacturing, testing, or assembly of bearing units, these measuring devices can also be extended to an exemplary embodiment of a device for determining a bearing preload of a rolling-element bearing. If, for example, a device for analyzing bearing damage is used, this device can be extended with relatively low expense to be a compact device which represents a part of an exemplary embodiment of a device for determining a bearing preload of a rolling-element bearing.

Figure 2:
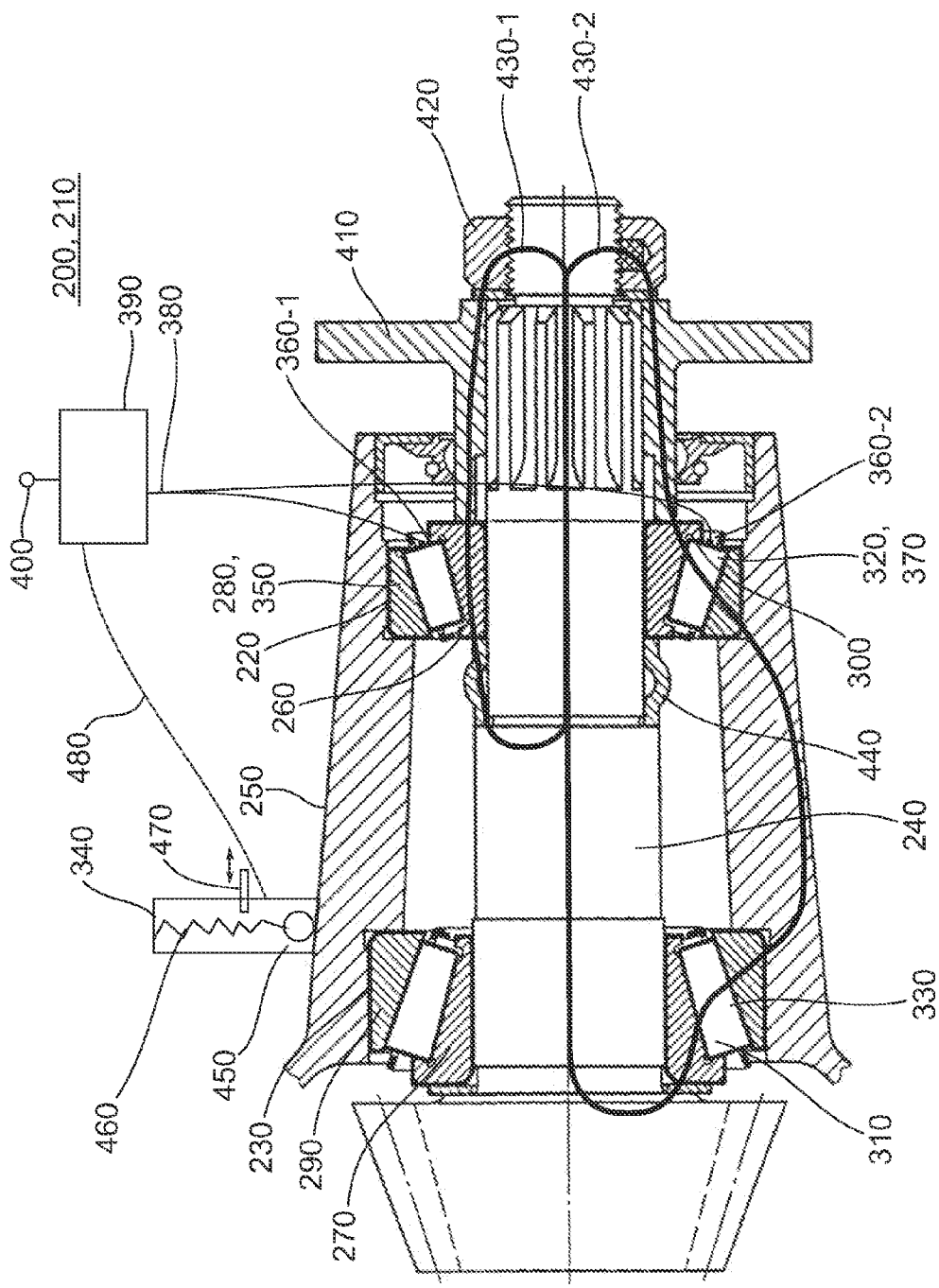
FIG. 2 is a schematic side elevational view, partly in section, of a bearing unit including a rolling-element bearing which includes a device for determining a bearing preload of the rolling-element bearing according to an exemplary embodiment.

FIG. 2 shows a portion of a rear axle gear or differential 200 of a motor vehicle, for example of an automobile or a truck, onto which an exemplary embodiment of a device according to an exemplary embodiment for determining a bearing preload of a rolling-element bearing is attached. As has been explained above, devices according to an exemplary embodiment are typically used in connection with manufacturing more-complex bearing units 210, as the portion of the rear axle gear 200 in FIG. 2 illustrates, but may also be used by the customer during assembly or maintenance of corresponding bearings.

Here the bearing unit 210 comprises a rolling-element bearing 220 as well as a further rolling-element bearing 230, which support and guide a drive shaft 240 with respect to a housing 250. In this case an inner ring 260 of the rolling-element bearing 220 or a further inner ring 270 of the further rolling-element bearing 230 is respectively mechanically connected to the drive shaft 240. An outer ring 280 of the rolling-element bearing 220 or a further outer ring 290 of the further rolling-element bearing 230 is connected to the housing 250 of the bearing unit 210. The two inner rings 260, 270 each have a guide flange 300 or a further guide flange 310, onto which the rolling elements 320 of the rolling-element bearing 220 or the further rolling elements 330 of the further rolling-element bearing 230 abut in their operating position, as shown in FIG. 2. In this case the rolling elements 320, 330 are formed as tapered rollers. Accordingly, the raceways of the inner rings 260, 270 and the outer rings 280, 290 are designed for these rolling-element shapes.

FIG. 2 further shows the components of a device for determining a bearing preload of a rolling-element bearing 220. The device comprises an exciter 340 which is configured to be indirectly or directly attachable to a component 350 of the rolling-element bearing 220. In FIG. 2, the component 350 is an outer ring 280 of the rolling-element bearing 220, and the exciter 340 is indirectly connected to the component 350 via the housing 250, i.e. to the outer ring 280 of the rolling-element bearing 220. However, in other exemplary embodiments the exciter 340 can also optionally be directly connectable to the respective component 350.

The device further comprises at least one vibration sensor 360. More specifically, the device shown in FIG. 2 comprises at least two vibration sensors 360-1 and 360-2 which are directly attached to the rolling elements 320 of the rolling-element bearing 220. The vibration sensors 360 are thus directly attached to a further component 370 of the rolling-element bearing 220, namely the rolling elements 320. Here the vibration sensors 360 are attached such that they can receive a mechanical reaction of the rolling elements 320, i.e. of the further component 370, and provide a sensor signal including corresponding information concerning the reaction. The sensor signal is transmitted to an evaluating circuit 390 via a cable 380. The evaluating circuit 390 is configured to, on the one side, receive the sensor signal and, on the other side, to provide an evaluation signal based on the sensor signal to a terminal 400, which evaluation signal includes information concerning the bearing preload.

If the rolling-element bearing 220 or its inner ring 260 is preloaded via an intermediate component 410 and a nut 420 connected to the drive shaft 240 via a thread, at least two load circuits 430-1 and 430-2 form. The load circuit 430-1 extends starting from the nut 420, via the intermediate component 410, via the inner ring 260, to which the intermediate component 410 is axially connected. The inner ring 260 is connect to the drive shaft 240 via a spring ring 440 and a shoulder of the drive shaft 240, so that the load circuit 430-1 is closed by this and by the screw between the drive shaft 240 and the nut 420. The load circuit 430-1 thus serves to secure the nut against loosening during operation.

The load circuit 430-2 also extends, starting from the nut 420, via the intermediate component 410 and the inner ring 260 of the rolling-element bearing 220. In contrast to the load circuit 430-1, however, the load circuit 430-2 extends via the rolling elements 320 and the outer ring 280 of the rolling-element bearing 220 into the housing 250 of the bearing unit 210. Starting from the housing 250, the load circuit 430-2 extends via the further outer ring 290, the further rolling elements 330, and the further inner ring 270 of the further rolling-element bearing 230 back via the drive shaft 240 and the screw to the nut 420. The load circuit 430-2 is thus responsible for the bearing preload, since it exerts corresponding forces via the involved inner rings 260, 270, the involved outer rings 280, 290, and the corresponding rolling elements 320, 330.

In the exemplary embodiment shown in FIG. 2, the exciter 340 includes a mass 450 which can be pretensioned (biased or urged) by a spring element 460. In this case the spring element 460 is embodied as a coil spring. The exciter 340 further includes a latch 470, which is moveable for example mechanically, but also optionally electrically, hydraulically, or pneumatically, and can release the mass 450 and the spring element 460 from a pretensioned state based on a trigger signal. Here the trigger signal can be transmitted to the latch 470 mechanically, electrically, optically, by radio, magnetically, or in a different manner.

In the simplest case the latch 470 is a mechanical latch which is manually releasable. In this way the mass 450 is released and driven against the housing 250 by the spring element 460, which leads to a shock-like excitation of the component 350 of the rolling-element bearing, in this case, the housing 250 of the rolling-element bearing. This in turn leads to the shock-like excitation of the outer ring 280 of the rolling-element bearing 220. Since a shock-like excitation is a substantially instantaneous or δ-like excitation, the rolling-element bearing 220 is thus excited with a relatively broad excitation frequency spectrum.

In other exemplary embodiments the exciter 240 can for example be configured to effect the shock-like excitation repeatedly. For this purpose a retracting element, for example a pneumatic spring element, can optionally be integrated in the exciter 240.

In the exemplary embodiment shown in FIG. 2 the exciter 340 stimulates or excites the system by a short impulse or a short shock. In other exemplary embodiments a corresponding excitation can also occur using a tunable exciter 340. The exciter 340 can be configured to effect an excitation that is tunable with respect to a frequency and/or an amplitude, of the component 350 of the rolling-element bearing 220. This can, for example, be implemented such that the exciter 340 includes a piezoelectric actuator which is correspondingly configured to excite, based on an excitation signal, the component 350 with a frequency and/or amplitude which depends on the excitation signal. For this purpose the exciter 340 can optionally be coupled to the evaluating circuit 390 via a corresponding optional connection 480. The connection 480 can in turn be an electrical, mechanical, pneumatic, optical, magnetic, or other type of connection, via which the corresponding excitation signal can be transmitted to the exciter 340. Alternatively or additionally, the connection 480 can also be used for transmitting the trigger signal, in order to effect the above-described shock-like excitation of the component 350. In this way the evaluating circuit 390 can optionally trigger the shock-like excitation of the component 350 of the rolling-element bearing 220.

As has already been explained above, the vibration sensors 360 can for example be formed such that they are magnetically connectable to the component 350, i.e. in the present case to the rolling elements 320 of the rolling-element bearing 220. For this purpose the vibration sensors 360 can include a corresponding magnet assembly. In addition to the microphone already mentioned, the vibration sensors 360 can also be microelectromechanical sensors, i.e. so-called MEMS sensors (MEMS =microelectromechanical system).

The evaluating circuit 390, as shown in FIG. 2, is connected to a plurality of vibration sensors 360. Here each of the vibration sensors 360 provides a sensor signal to the evaluating circuit 390. The evaluating circuit can now be configured to process the plurality of sensor signals individually or after averaging them. The averaging can for example be the determining of an arithmetic mean, a geometric mean, or another averaging based on a mathematical conversion of the sensor signals. Depending on the sensor signals, the averaging can be carried out in the time domain or in the frequency domain. Of course, the evaluating circuit can also be configured to transform the sensor signal from the time domain into the frequency domain or vice versa, for example via a Fourier transform or a fast Fourier transform (FFT).

Thus the vibration sensors 360 can be formed to provide the sensor signal so that it includes information related to a frequency spectrum of the reaction. Here a transmission of the relevant frequency spectrum is possible both in the time domain and the frequency domain.

Since, as has already been explained above, a change in the bearing preload has an influence on the natural frequency of the respective vibration system, a change of the bearing preload can be determined via a change of the natural frequency of the system. It should be noted that the load circuit 430-1 used to secure the nut against loosening may also influence the position of the natural frequency of the system, since this can also exert forces on the rolling-element bearing 220. Thus, as shall now be explained in the context of FIG. 3, the evaluating circuit may be configured so that it provides information about the bearing preload in the evaluating signal based on a frequency value which corresponds to a position of a reaction maximum in the frequency spectrum of the reaction, or a part of the frequency spectrum of the reaction.

Figure 3:
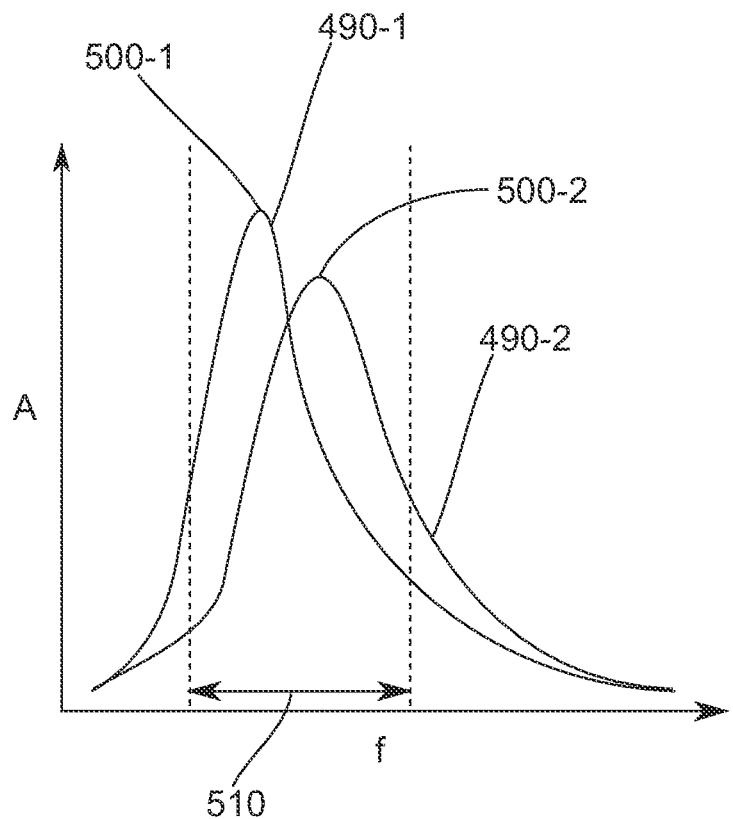
FIG. 3 is a graph schematically showing two plots of reactions of a rolling-element bearing to an excitation at different bearing preloads.

FIG. 3 shows two frequency spectra 490-1 and 490-2 which correspond to two different bearing preloads. Here the reaction of the rolling-element bearing 220 or the further component 370 or the component 350 is plotted as a function of the frequency f. The amplitude A of the vibration, as shown in FIG. 3, the intensity, or another energy value or energy-related value can be used for example as the reaction. Of course corresponding mathematically-derived values of the above-mentioned reactions can also be used, i.e. for example logarithmic values, absolute values, quadratic values, or values calculated in another manner. The preload is often expressed as a force in Newtons or kilo-Newtons, while the corresponding frequencies lie (fall) in the range of kilohertz (kHz).

Here the frequency spectra 490 each have a frequency value 500-1 and 500-2 which indicates a maximum value of the respective reaction. Since the natural frequency tends to increase with increasing bearing preload, the frequency value 500-1 of the frequency spectrum 490-1 corresponds here to a lesser bearing preload than the frequency value 500-2 of the frequency spectrum 490-2.

Since the bearing unit 210 is often a complex mechanical system having more than one natural frequency, it may sometimes be advisable to limit the frequency range in which the device according to an exemplary embodiment searches for the frequency value 500 in question by using a band-pass, high-pass, or low-pass filter. This is indicated in FIG. 3 by a frequency range 510, the limits of which are represented as two vertically-extending dashed lines.

If an exciter 340 having a broad excitation frequency spectrum is used, for example if a shock-like excitation is applied, it can be very useful to use an appropriate filter to exclude consideration of corresponding natural frequencies of other components during the evaluation by the evaluating circuit. However, even in the case of a tunable excitation, wherein for example individual frequencies are selectively coupled into the component 350 of the of the rolling-element bearing 220, it can be useful to use an appropriate filter to suppress an excitation of other components due to higher harmonic contributions or other effects. In such a case, the frequency value 500 of the maximum can be determined by a selective/targeted tuning of the excitation, for example of a traversing of a frequency range, for example of the frequency range 510.

The evaluating circuit 390 can also provide, in addition to the location of the frequency maximum 500, additional information concerning the bearing preload in the context of the evaluation signal. Thus for example the determined frequency value 500 can be compared to a predetermined frequency value or to a predetermined frequency range. If they match or differ only slightly, then the evaluating circuit 390 can, for example, provide a signal which indicates that the desired bearing preload is present or, optionally, indicate by how much the current preload must be corrected in order to achieve the desired bearing preload. Optionally it is also possible to determine the direction in which the corresponding correction of the bearing preload is to be made by comparing the frequency value 500 to the predetermined frequency value or the predetermined frequency range.

The predetermined frequency value or the predetermined frequency range is often quite difficult to determine. Thus in many cases an ideal pretensioning can in principle be calculated based on the planned (intended) field of application of the present teachings and the technical data. It may however be necessary to determine a desired pretension or axial force empirically using a prototype or sample, and then determine the position of the frequency value 500 or the frequency spectrum 490 of this sample. If this has been determined, i.e. measured, then the predetermined frequency range can be determined which is within tolerance for the respective application. However, in other applications it can also be possible to determine entirely by calculation the predetermined frequency values or the predetermined frequency ranges, for example by using the finite element method (FEM).

While the use of a device according to an exemplary embodiment has been described above only in the context of a bearing unit 210 including two rolling-element bearings 220, 230, exemplary embodiments are of course not limited to this case. Thus devices can in principle be used with each bearing unit 210 and/or each to-be-preloaded rolling-element bearing 220. Rolling-element bearings to be preloaded thus include not only tapered roller bearings, but also angular contact ball bearings or other type of bearings.

The positions of the guide flanges 300, 310 can also be different in different rolling-element bearings 220, 230. Optionally a corresponding guide flange can also be completely omitted, or the rolling elements 320, 330 may have no contact therewith. In such a case, for example, an implemented rolling-element cage can abut on a corresponding guide flange.

Exemplary embodiments can thus optionally make possible a simpler determination of a bearing preload of a rolling-element bearing.

Although some aspects of the present embodiments have been described in the context of a device, it is to be understood that these aspects also represent a description of a corresponding method, so that a block or a component of a device is also understood as a corresponding method step or as a feature of a method step. In an analogous manner, aspects which have been described in the context of or as a method step also represent a description of a corresponding block or detail or feature of a corresponding device.

Depending on certain implementation requirements, exemplary embodiments may be implemented in hardware or in software. The implementation can by carried out by using a digital storage medium, for example a floppy disk, a DVD, a Blu-ray Disc, a CD, a ROM, a PROM, an EPROM, an EEPROM, flash memory, a hard drive or another type of magnetic or optical storage, on which electronically-readable control signals are stored which interact or can interact with one or more programmable hardware components such that one or more of the methods described herein are carried out.

A programmable hardware component can be formed by a processor, a computer processor (CPU=central processing unit), a graphics processor (GPU=graphics processing unit), a computer, a computer system, an application-specific integrated circuit (ASIC), an integrated circuit (IC), a system-on-a-chip (SOC), a programmable logic element, or a field programmable gate array (FPGA) including a microprocessor.

The digital storage medium, which may be non-transient, can therefore be machine- or computer readable. Some exemplary embodiments thus comprise a data carrier which includes electronically-readable control signals which are capable of interacting with a programmable computer system or a programmable hardware component such that one of the methods described herein is carried out. An exemplary embodiment is thus a data carrier (or a digital storage medium or a computer-readable medium) on which the program for carrying out one of the methods described herein is recorded.

In general, exemplary embodiments are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A further exemplary embodiment is a data stream, a signal sequence, or a sequence of signals which represents the program for carrying out one of the methods described herein. The data stream, the signal sequence, or the sequence of signals can for example be configured to be transferred via a data communications connection, for example via the Internet or another network. Exemplary embodiments are thus also signal sequences which represent data, which are intended for transmission via a network or a data communications connection, wherein the data represent the program.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, or magnetic components, or components based on another functional principle. Accordingly, data, values, sensor values, or other program information can be captured, determined, or measured by reading a storage location. By reading one or more storage locations, a program can therefore capture, determine or measure sizes, values, variables, and other information, as well as cause, induce, or perform an action by writing to one or more storage locations, as well as control other apparatuses, machines, and components, and thus for example also perform complex processes using actuators.

The above-described exemplary embodiments represent only an illustration of the principles of the present invention. It is understood that modifications and variations of the arrangements and details described herein will be clear to other persons of skill in the art. It is therefore intended that the invention be limited only by the scope of the following patent claims, and not by the specific details which have been presented with reference to the description and the explanation of the exemplary embodiments.

The features disclosed in the above description, the claims, and the drawings can be meaningful for the realization of exemplary embodiments in their different designs, both individually and in any combination, and—insofar as nothing different results from the description—can be combined with one another in any way.

REFERENCE NUMBER LIST

100 Start
110 Providing
120 Exciting
130 Recording (capturing)

140 Providing
150 Setting
160 End
200 Rear axle gear
210 Bearing unit
220 Rolling-element bearing
230 Further rolling-element bearing
240 Drive shaft
250 Housing
260 Inner ring
270 Further inner ring
280 Outer ring
290 Further outer ring
300 Guide flange
310 Further guide flange
320 Rolling elements
330 Further rolling elements
340 Exciter
350 Component
360 Vibration sensor
370 Further component
380 Cabling
390 Evaluating circuit
400 Terminal
410 Intermediate component
420 Nut
430 Load circuit
440 Spring ring
450 Mass
460 Spring element
470 Latch
480 Connection
490 Frequency spectrum
500 Frequency value of the maximum
510 Frequency range

What is claimed is:

1. A method for determining an optimum bearing preload of a rolling-element bearing, comprising:
providing a shaft;
providing the rolling-element bearing comprising an inner ring fixed on the shaft and an outer ring, a plurality of rolling elements located between the inner ring and the outer ring;
providing a housing disposed over the rolling-element bearing and the shaft, a radially inner surface of the housing having a recess in which the outer ring is positioned;
rotating the inner ring of the rolling-element bearing for at least five complete rotations;
attaching an exciter to an outer surface of the housing, the exciter being configured to indirectly transmit force to the outer ring of the rolling-element bearing via the housing, the exciter causing the outer ring of the rolling-element bearing to receive vibrations when the rolling-element bearing is not rotating;
providing an intermediate component concentrically positioned over the shaft and within the housing, the intermediate component being configured to slide over the shaft and having an axial end configured to axially bias the inner ring to communicate a preload to the rolling-element bearing;
after the step of rotating the inner ring, preloading the rolling-element bearing by applying a force to the intermediate component which transfers the force to the rolling-element bearing;
after the step of preloading the rolling-element bearing, and while the rolling-element bearing is not rotating, exciting the rolling-element bearing by operating the exciter, the exciting of the rolling-element bearing causing the rolling-element bearing to receive vibrations;
recording by at least one vibration sensor connected to the rolling-element bearing a mechanical reaction of the rolling-element bearing in response to the vibrations received from the exciter while the rolling-element bearing is subject to the preloading, the at least one vibration sensor providing a sensor signal which includes information concerning the mechanical reaction;
providing an evaluating circuit configured to receive the sensor signal and provide an evaluation signal based on the sensor signal, the evaluation signal including information concerning the preloading;
before functional operation of the rolling-element bearing, comparing by the evaluating circuit of the evaluation signal to a predetermined frequency range, the predetermined frequency range corresponding to the optimum bearing preload; and
if the evaluation signal is not within the predetermined frequency range, adjusting the force applied to the intermediate component.

2. The method according to claim 1, wherein the step of attaching the exciter further comprises the exciter being configured to excite, in response to a trigger signal, the rolling-element bearing by an impact excitation having an excitation frequency spectrum.

3. The method according to claim 2, wherein the step of attaching the exciter further comprises the exciter having a mass biased (urged) by a spring element wherein the mass effects the impact excitation of the rolling-element bearing in response to the trigger signal.

4. The method according to claim 1, wherein the step of attaching the exciter further comprises the exciter being configured to effect an excitation of the rolling-element bearing, which excitation is tunable with respect to at least one of a frequency and an amplitude.

5. The method according to claim 1, wherein the step of recording by the at least one vibration sensor further comprises the at least one vibration sensor being configured to be magnetically attachable to at least one of the plurality of rolling elements of the rolling-element bearing.

6. The method according to claim 1, wherein the step of recording by the at least one vibration sensor further comprises the at least one vibration sensor being configured such that the sensor signal includes information concerning a frequency spectrum of the reaction.

7. The method according to claim 6, wherein the step of providing the evaluating circuit further comprises the evaluating circuit being configured to provide information concerning the preloading, which information is based on a frequency value which corresponds to a position of a reaction maximum in the frequency spectrum of the reaction or to a portion of the frequency spectrum of the reaction.

8. The method according to claim 7, wherein the step of providing the evaluating circuit further comprises the evaluating circuit being configured to provide information concerning the preloading, which information is based on a comparison of the frequency value to a predetermined frequency value or to the predetermined frequency range.

9. The method according to claim 1, further comprising the step of attaching the at least one vibration sensor to at least one of the plurality of rolling elements.

10. The method according to claim 9, wherein the step of attaching the at least one vibration sensor further comprises the at least one vibration sensor being attached directly to a lateral (side) surface of the at least one of the plurality of rolling elements.

11. The method according to claim 1, further comprising the step of:
if the evaluation signal is not within the predetermined frequency range, determining by the evaluating circuit if a greater or lower preloading force is required.

12. A method for determining an optimum bearing preload of a first rolling-element bearing and a second rolling-element bearing located in a common housing, comprising:
providing a shaft;
providing the first and second rolling-element bearings each comprising an inner ring fixed on the shaft, an outer ring, and a plurality of rolling elements located between the inner ring and the outer ring;
providing the common housing disposed over the first and second rolling-element bearings and the shaft, a radially inner surface of the common housing having a recess in which the outer rings of each of the first and second rolling-element bearings are positioned such that an outer radial surface of each of the outer rings directly contacts the common housing;
rotating the inner rings of each of the first and second rolling-element bearings for at least five complete rotations;
attaching an exciter to an outer surface of the common housing, the exciter being configured to indirectly transmit force to the outer rings of each of the first and second rolling-element bearings via the common housing, the exciter causing the outer rings of each of the first and second rolling-element bearings to receive vibrations when the first and second rolling element bearings are not rotating;
providing an intermediate component concentrically positioned over the shaft and within the common housing, the intermediate component being configured to slide over the shaft and having an axial end configured to directly contact the inner ring of the first rolling-element bearing to communicate a preload to the first rolling-element bearing which communicates the preload to the second rolling-element bearing such that each of the first and second rolling element bearings are preloaded;
after the step of rotating the inner rings, preloading the first and second rolling-element bearings by applying a force to the intermediate component which transfers the force to the first rolling-element bearing which transfers the force to the second rolling-element bearing;
after the step of preloading the first and second rolling-element bearings, and while the first and second rolling-element bearings are not rotating, exciting the first and second rolling element bearings by operating the exciter, the exciting of the first and second rolling-element bearings causing the first and second rolling-element bearings to receive vibrations;
recording by at least one vibration sensor connected to each of the first and second rolling-element bearings a mechanical reaction of the first and second rolling-element bearings in response to the vibrations received from the exciter while the rolling-element bearings are subject to the preloading, the at least one vibration sensor providing a sensor signal which includes information concerning the mechanical reaction;
providing an evaluating circuit configured to receive the sensor signals and provide at least one evaluation signal based on the sensor signals, the at least one evaluation signal including information concerning the preloading;
before functional operation of the rolling-element bearings, comparing by the evaluating circuit of the evaluation signal to a predetermined frequency range, the predetermined frequency range corresponding to the optimum bearing preload; and
if the at least one evaluation signal is not within the predetermined frequency range, adjusting the force applied to the intermediate component.

13. The method according to claim 12, further comprising the step of:
if the at least one evaluation signal is not within the predetermined frequency range, determining by the evaluating circuit if a greater or lower preloading force is required.

14. The method according to claim 12, further comprising the step of attaching the at least one vibration sensor to at least one of the plurality of rolling elements.

15. The method according to claim 12, wherein the step of providing an evaluating circuit further comprises the evaluating circuit being configured to average the sensor signals and provide a single evaluation signal based on the averaged sensor signals.

* * * * *